United States Patent
Bowen et al.

[11] Patent Number: 5,487,124
[45] Date of Patent: Jan. 23, 1996

[54] BIDIRECTIONAL WAVELENGTH DIVISION MULTIPLEX TRANSCEIVER MODULE

[75] Inventors: Terry P. Bowen, Etters; Warren H. Lewis, Elizabethtown, both of Pa.; Richard C. Bergstrom, Morgan Hill, Calif.

[73] Assignee: The Whitaker Corporation, Wilmington, Del.

[21] Appl. No.: 269,428

[22] Filed: Jun. 30, 1994

[51] Int. Cl.$^6$ ............................................. G02B 6/36
[52] U.S. Cl. ................................................. 385/93; 385/89
[58] Field of Search ................................. 385/89–94, 14, 385/49, 39

[56] References Cited

U.S. PATENT DOCUMENTS

| | | | |
|---|---|---|---|
| 4,068,952 | 1/1978 | Erbert et al. | 385/48 |
| 4,643,521 | 2/1987 | Harstead et al. | 385/31 |
| 4,695,697 | 9/1987 | Kosa | 385/94 |
| 4,730,330 | 3/1988 | Plihal et al. | 385/37 |
| 4,787,696 | 11/1988 | Norris et al. | 385/89 |
| 4,824,193 | 4/1989 | Maeda et al. | 385/31 |
| 4,834,485 | 5/1989 | Lee | 385/37 |
| 4,887,255 | 12/1989 | Handa et al. | 385/31 |
| 4,912,523 | 3/1990 | Refi et al. | 385/37 |
| 4,995,696 | 2/1991 | Nishimura et al. | 385/92 |
| 5,011,255 | 4/1991 | Bowen et al. | 350/96.19 |
| 5,039,191 | 8/1991 | Myszka | 385/31 |
| 5,058,978 | 10/1991 | Kondoh et al. | 385/43 |
| 5,082,339 | 1/1992 | Linnebach | 385/37 |
| 5,127,072 | 6/1992 | Blauvelt et al. | 385/88 |
| 5,127,075 | 6/1992 | Althaus et al. | 385/92 |
| 5,179,609 | 1/1993 | Blonder et al. | 385/89 |
| 5,253,313 | 10/1993 | Kishima | 385/38 |
| 5,285,274 | 2/1994 | Tanno et al. | 385/37 |
| 5,293,441 | 3/1994 | Tanisawa | 385/92 |
| 5,345,530 | 9/1994 | Lebby et al. | 385/89 |

FOREIGN PATENT DOCUMENTS

| | | | |
|---|---|---|---|
| 1-225907 | 9/1989 | Japan | 385/89 |
| 2-19804 | 1/1990 | Japan | 385/89 |

*Primary Examiner*—Rodney B. Bovernick
*Assistant Examiner*—John Ngo

[57] ABSTRACT

A compact optical transceiver including a ceramic mounting block 1, with a laser diode 3 abutting a first end of the mounting block for generating light of a first wavelength. A GRIN lens 5, mounted to the mounting block, then receives and focuses the generated light to an optical fiber 13 which is attached to the compact optical transceiver. A dichroic substance 7 acts as a beamsplitter by passing light of a first wavelength and deflecting light of a second wavelength. The dichroic substance 7 is coated on a glass plate, which is mounted in a first angular groove of the mounting block. The beamsplitter 7 receives and passes the generated light of the first wavelength which has been focused by the GRIN lens 5. From a remote transmitter, light of a second wavelength is then transmitted through an optical fiber 13, to the compact optical transceiver from a direction opposite that of the light generated by the laser diode 3. The light transmitted from the optical fiber 13 is then transmitted and output through ferrule 11, attachable to the optical fiber and attached in a second, V-shaped, groove of the ceramic mounting block 1. The light of the second wavelength is output to the beamsplitter 7 and is deflected through a bore hole 21 in the ceramic mounting block to a detector 9 abutting the bottom of the mounting block. Optionally, a blocking filter 15 can be included between the detector and the optical fiber end face for blocking light of any wavelengths different from the first and second wavelengths, from reaching the detector 9.

29 Claims, 2 Drawing Sheets

BIDIRECTIONAL WAVELENGTH DIVISION MULTIPLEX TRANSCEIVER MODULE

FIELD OF THE INVENTION

The present invention relates to a novel bidirectional wavelength division multiplex transmitter/receiver (transceiver) module adaptable for use with a single mode optical fiber. More particularly, the present invention relates to a transceiver module connectable to a single mode optical fiber which utilizes a single graded refractive index (GRIN) lens to focus light from a laser diode to an optical fiber. Along the way, the light travels through a glass beamsplitter, thinly coated with a dichroic substance, with the coating being designed to transmit light of the wavelength generated by the laser diode. Light returning from a remote transmitter through the optical fiber is of a second wavelength which does not pass through the beamsplitter, but which is instead reflected by the beamsplitter onto a detector.

BACKGROUND OF THE INVENTION

Optical component packaging to date has employed metallic cans into which are disposed optoelectronic devices, with connections made to optical fibers. Typically, the active optoelectronic device is mounted on a submount and the submount is bonded to a metal package. Wire bonds are used to make electrical connection to wire pins which extend from a-metal header. A hermetic seam seal is used to bond a metal cap to the header. Generally, the caps are lensed with a ball lens or have an ultra flat glass window or cap with an optical fiber pigtail.

Typically, the metallic cans include optoelectronic components such as laser diodes or detectors, and are sometimes referred to as can lasers and can detectors. As previously stated, the cans, especially the detector can, are usually lensed detector cans.

In other known optical component packages utilizing laser cans and detector cans, packaging problems arose and alignment problems arose in transmitting light from the laser can into the optical fiber, and in transmitting light from the optical fiber to the detector can. Traditionally, a beamsplitting cube was utilized for focusing the light from the laser can to the optical fiber and for focusing light from the optical fiber to the detector can. This known device was not only bulky in size, but also required substantial precision alignments. Further, the beamsplitting cube, made from two right angle prisms with a coating between adjoining surfaces, was very expensive and thus made the overall device expensive.

SUMMARY OF THE INVENTION

Accordingly, it is a primary object of the present invention to provide a low cost, compact bidirectional wavelength division multiplex transceiver module (or compact optical transceiver).

The objects of the invention are filled by providing a compact optical transceiver comprising:

a mounting block including at least first and second positioning grooves formed therein;

light generating means, abutting a first end of the mounting block, for generating light of a first wavelength;

light focusing means, mounted to the mounting block, for receiving and focusing the generated light to an optical fiber;

beamsplitting means, mounted in the first positioning groove of the mounting block, for receiving and passing the generated light of the first wavelength and for receiving and deflecting light of a second wavelength different from the first wavelength;

detecting means, abutting the mounting block, for receiving and detecting the deflected light of the second wavelength; and a ferrule, attachable to the optical fiber and attached in the second positioning groove of the mounting block, for receiving the focused light of a first wavelength passed through the beamsplitting means and for outputting light of a second wavelength from the optical fiber to the beamsplitting means.

Advantages of this compact optical transceiver of the present invention include: (1) a device which is small in size and therefore compact; (2) a device which can be constructed rather inexpensively; and (3) a device which requires only minimal alignment in the X and Y direction with regard to the laser can, and in the Z direction with regard to the ferrule containing the optical fiber.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF PREFERRED EMBODIMENT

Known concepts exist regarding alignments and bonds between optoelectronic devices and optical fibers; aligning and bonding metallic cans containing optoelectronic devices to a submount and to other external components; and actively aligned connector assemblies and submounts for an optical fiber and optoelectronic devices. Optical alignments can be performed both actively and passively. Active alignments are most common and are required for packages based on transistor outline (TO) cans, such as laser cans or detector cans, since there is no reference to locate the optical device in the can.

An active alignment is where the laser or detector device is operated and a fiber is manipulated in front of it until the optical signal is peaked. The fiber is then bonded to the package. Further, details regarding known connections between the optical fiber and ferrule for example, electrical connections between the laser diode and other external components and between the detector and other external components, conductive leads and wires, will not be further described for the sake of brevity.

Figure 1:
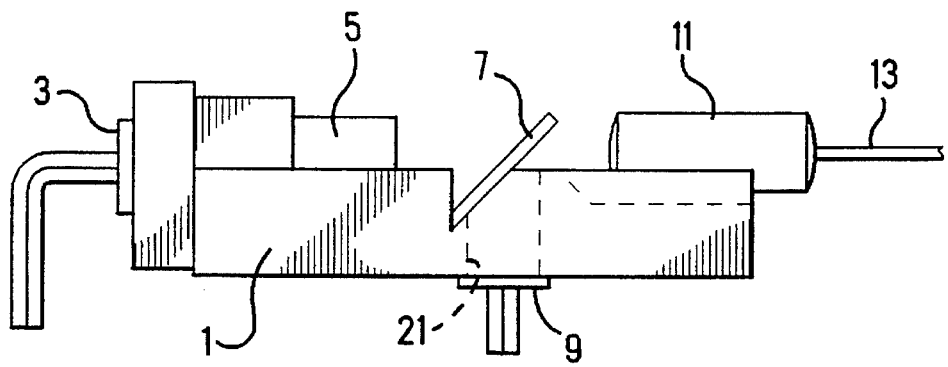
FIG. 1 is a first side elevational view of the bidirectional wavelength division multiplex transceiver module of the present invention.

Referring to FIG. 1, there is illustrated an example of the bidirectional wavelength division multiplex transmitter/receiver (transceiver) module of the present invention. The module includes a laser diode 3 as a light source connected to a mounting block 1, and a light detector 9 connected to mounting block 1. In present embodiment, the laser diode 3 and detector 9 are included as part of the compact optical transceiver of the present invention and include known external electrical connectors. The mounting block 1 may be a ceramic mounting block or may be made of any similar stable material.

Figure 3:
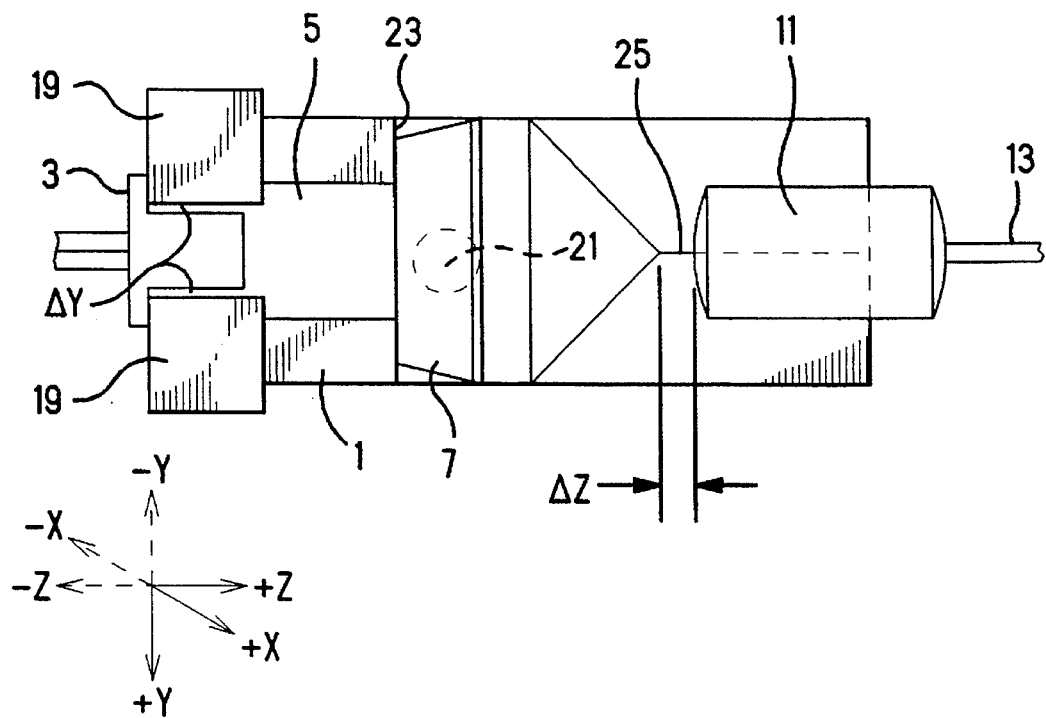
FIG. 3 is a top plan view of the bidirectional wavelength division multiplex transceiver module of FIG. 1.

Mounting block 1 is machined to include first and second angular positioning grooves. The first angular groove 23 (of FIG. 2) includes one angled side, the one angled side extending in a direction perpendicular to a direction of travel of light from laser diode 3. Second groove (25 of FIG. 3) includes a pair of angled sides defining a V-shape, the sides extending in a direction parallel to a direction of travel of light from laser diode 3. Each of sides of groove 25 are angled so as to converge at a common line parallel to the direction of light travel (Z direction) thus defining the V-shape, as shown in FIG. 3. A third angular groove, similar to first angular groove 23, may be machined so as to hold filter 15. Further description regarding these angular grooves, and their purpose, will be described hereinafter.

Abutting a first end of mounting block 1 is a laser diode or laser can 3. Abutting a bottom side of the mounting block is a detector or detector can 9. FIG. 1 further illustrates a cylindrical ferrule 11 which is positioned in an angular groove (25 of FIG. 3) of mounting block 1, and which is further attachable to optical fiber 13. Ferrule 11 acts as a mounting aid for optical fiber 13 and is the same as is used in known fiber optic connectors.

A light focusing device 5 is shown in FIG. 1. This can be, for example, a graded refractive index (GRIN) lens for receiving and focusing light from laser diode 3 to the optical fiber 13. Conjugate ratio of the optical transceiver system is such that an output light cone emerging from laser 3 and an input light cone to optical fiber 13 are matched. The GRIN lens has several advantages including the fact that it is inexpensive, it is of a high numerical aperture, and it is physically easy to align to.

Finally, FIG. 1 illustrates a beamsplitting device 7. Beamsplitter 7, in one preferred embodiment, includes a glass substrate which is thinly coated on a mirror side facing ferrule 11 with a dichroic substance composed of dielectric materials such as ZnS, $Al_2O_3$ or $TiO_2$, so as to pass light of a first predetermined wavelength and so as to block and thereby reflect light of a second predetermined wavelength.

Figure 2:
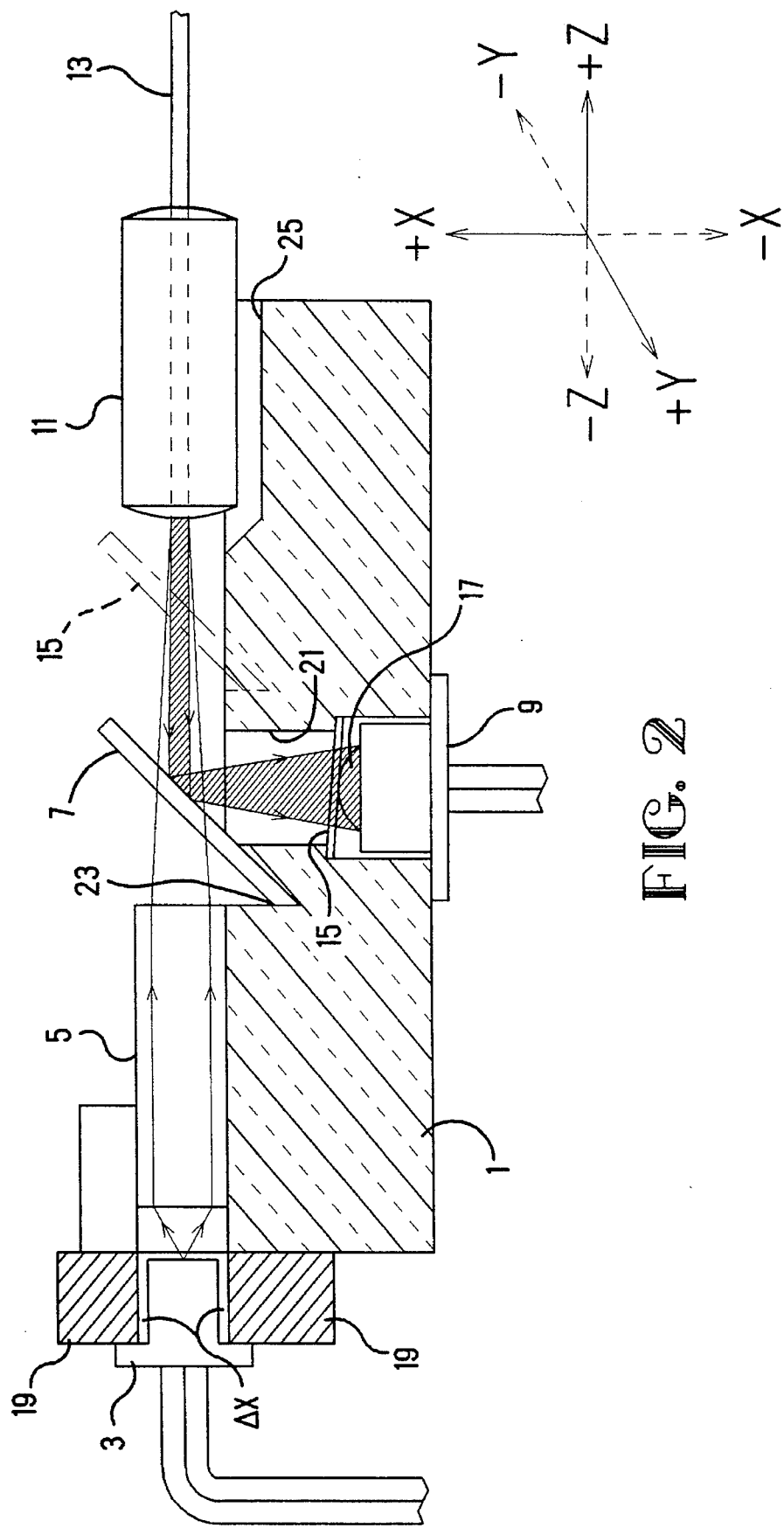
FIG. 2 is a cutaway view of the bidirectional wavelength division multiplex transceiver module as shown in FIG. 1 illustrating light paths from the laser to the optical fiber and from the optical fiber to the detector.

As shown in FIG. 2, the aforementioned dichroic beamsplitter 7 is mounted to the mounting block in the angular groove 23 of the mounting block. Angular groove 23 includes one angled side, extending along the Y axis. The dichroic beamsplitter 7 passes light of a wavelength approximately equal to that generated by laser diode 3 (e.g. a short wavelength of 1300 nm), and reflects a light of wavelength approximately equal to that generated by a laser diode at a remote transceiver (e.g. a long wavelength of 1500 nm). At the aforementioned remote transceiver, the dichroic beamsplitter 7 would act in reverse, deflecting light of the short wavelength and passing light of the long wavelength.

Also, as shown in FIG. 2, laser diode 3 abuts a first end of the mounting block, and is attached to adjustable clamps 19 extending from the mounting block by an epoxy, or by other more expensive methods such as soldering or welding. The laser diode 3, once properly aligned, can be rigidly fixed to the clamps (or alignment blocks) 19 with respect to mounting block 1 for alignment in the X direction ($\Delta X$) and the Y direction ($\Delta Y$) as shown in FIGS. 2 and 3.

In other words, the laser diode 3 remains still, once aligned, and clamps 19 are movable based upon an extension or tongue of clamps 19 being slidable in grooves (machined as discussed with grooves 23 and 25) of mounting block 1, in the illustrated X and Y direction of FIGS. 2 and 3 to eliminate any gap of $\Delta X$ and $\Delta Y$ to thereby secure laser can 3. Laser diode 3, once the clamps 19 are properly positioned, can then be mounted to clamps 19 by the aforementioned epoxy. Alternatively, laser diode 3 can be manually aligned in the X direction ($\Delta X$), and in the Y direction ($\Delta Y$), before being affixed to clamps 19 by epoxy.

Further, as shown in FIG. 2, a bore hole 21 is provided in mounting block 1 to provide a pathway for light traveling from dichroic beamsplitter 7 to detector 9. Bore hole 21 can also be machined as was described with angular grooves 23 and 25. The diameter of bore hole 21 is determined by 0.25× the optical path length between ferrule 11 and detector lens 17. Detector 9 can be a lensed detector can, and thus can include a lens 17.

Finally as shown in FIG. 2 a blocking filter 15 can be included for blocking light greater than a predetermined wavelength, for example 1620 nanometers (1.62 μm), from being sent from the optical fiber 13 to the detector 9. By using such a filter 15 for blocking light above 1620 nm, radiation is kept from interfering with the receiver or detector 9. This blocking filter, is preferably placed above lens 17 to block light of not only wavelengths greater than a predetermined wavelength (1620 nanometers for example) from reaching detector 9, but also ambient light from elsewhere and also light from laser diode 3 that may happen to be reflected toward detector 9 even through beamsplitter 8. If blocking filter 15 is alternatively placed at the location as is shown by the dashed lines (filter 15) in FIG. 2, it can be mounted in a third angular positioning slot, machined similar to first angular slot 23 in mounting block 1.

It is preferred that an antireflective coating such as silicon nitride be provided on the diode-proximate side of glass element 7 to minimize the reflection of any portion of light emitted by diode 3. Further it is preferred that the inner surface of at least a lid of an enclosure of the module above the beamsplitter by nonreflective such as be being coated with an opaque matte black material to further minimize the possibility of reflection of emitted light reflected upwardly by glass element 7, downwardly toward detector 9.

FIG. 3 illustrates a top plan view of the compact optical transceiver as shown in FIG. 1. This illustrates, more clearly, the bore hole 21 providing a passageway for light from dichroic beamsplitter 7 to detector 9. Further, FIG. 3 also illustrates the V-shaped groove 25 in which the ferrule 11 is attached to mounting block 1. V-shaped groove 25 is a second angular groove machined in the mounting block itself, that includes a pair of angular sides extending in a direction parallel to the direction of light travel (Z-direction) converging on a common line to thereby form a "V". Ferrule 11 can then be aligned and adjustably attached in the aforementioned V-shaped groove 25 to provide for adjustment in the Z-direction as illustrated by $\alpha Z$ shown in FIG. 3.

The V-groove is of a size greater than the diameter of ferrule 11. Ferrule 11 is slid in V-groove using external fixturing and is fastened down with an epoxy before the X:Y alignment of laser diode 3 is finalized. Finally, in one preferred embodiment, the optical fiber in the ferrule includes an end face having a 6°–9° face angle. This acts to prevent reflected light from returning to the aforementioned remote transmitter through the optical fiber 13.

Operation of the compact optical transceiver of the present invention will now be described.

As shown in FIG. 2, light of a first predetermined wavelength (which will pass through beamsplitter 7) is initially generated by the laser diode 3. In one preferred embodiment, a laser beam of 1.3 μm is generated with the numerical aperture of 0.5 N.A. (the numerical aperture of 0.5 N.A. being characteristic of this device). Light is then focused by the GRIN lens 5, while traveling in +Z direction as shown in FIG. 2, to optical fiber 13. Although GRIN lens 5 provides for focusing of light to optical fiber 13, light does pass through the dichroic beamsplitter 7 and the blocking filter 15 (if present), before reaching the ferrule 11 and optical fiber 13. The ferrule 11 acts as a mounting device for optical fiber 13 which further aids in optical alignment.

Light of a second wavelength of 1.55 μm for example, from a remote transmitter (which can be similar to the compact optical transceiver of FIG. 1) is forwarded through optical fiber 13. This light, traveling in the −Z direction, which is further illustrated by the hash marks in FIG. 2, travels to blocking filter 15 (if present). This blocking filter preferably blocks all light greater than 1620 nm, in one preferred embodiment.

Light then passes to beamsplitter 7, which may be a glass substrate coated with a dichroic substance. The dichroic substance allows for the passing of light beams less than or equal to a first wavelength (for example ≦1.3 μm as generated by laser diode 3), and for the deflecting of light beams greater than or equal to a second wavelength (for example ≧1.55 μm as generated by a laser diode 3 of the remote transceiver), the first and second wavelengths being dependent upon the dichroic substance used. However, it should be noted that the aforementioned wavelengths are not limitive of the present invention since it is only necessary for the laser can 3 to generate light of a first wavelength, and for the remote transmitter, which provides light to optical fiber 13 which is eventually output in the −Z direction, to generate light of a wavelength different from the first wavelength in this preferred embodiment, the light generated by laser diode 3 is of a first wavelength approximately equal to 1.3 μm (and thus passes through dichroic beamsplitter 7 in the +Z direction to optical fiber 13) and the light generated from the remote transmitter traveling in the −Z direction is preferably of a second wavelength of 1.55 μm (and thus is reflected by dichroic beamsplitter 7).

The light from the remote transmitter impinges upon the dichroic substance of the beamsplitting element 7, and is redirected (or reflected), based upon angular slot 23, through bore hole 21 to detector 9. As previously stated, a light blocking filter 15 can alternately be present proximate to lens 17 of FIG. 2, for blocking all light above a predetermined wavelength, for example 1620 nanometers. Lens 17 acts to focus light onto a small active area of detector 9 (50 μm), for subsequent detection by detector 9.

As previously mentioned, two optical transceivers (one at a given location and one at a remote location) make up a system. A laser diode 3 of the transceiver at the given location generates light of a first wavelength (e.g. 1.3 μm). Dichroic beamsplitter 7 of that transceiver then passes light of the first wavelength and deflects light of the second wavelength (e.g. 1.55 μm). It should be understood, however, that the laser diode of the remote transceiver generates light of a second wavelength (e.g. 1.55 μm) and its corresponding dichroic beamsplitter 7 passes light of second wavelength and deflects light of the first wavelength.

With regard to the formation of the compact optical transceiver itself, in a preferred embodiment, the mounting block can be a molded or a machined ceramic mounting block which provides a base for the transceiver module itself. Angular positioning slot 23, bore hole 21, and V-groove positioning slot 25 are molded or machined into the ceramic block (and if necessary, the additional angular positioning slot for block filter 15).

Once the aforementioned positioning slots have been machined or molded, the aforementioned components of the optical transceiver can be positioned and attached to the ceramic mounting block 1.

The laser can 3, when properly aligned and positioned, can be soldered or an epoxy can be used to fasten it to clamps 19, adjusted in the ΔX and ΔY direction. The detector can 9 can then be fixed into position mechanically to a sufficient tolerance. Once the GRIN lens 5 and ferrule 11 have been positioned and mounted with the optical fiber 13 attached, the optical path components are then sealed with a membrane and overmolded/sealed in a conventional RIM process or encapsulants in another low pressure technique. The seal is preferably a hermetic seal.

The invention is not limited to the exact structure described. For example, in place of laser diode 3, other alternative light sources may be used. However, it should be noted that use of a conventional LED for example, might cause a reduction in performance (launch power and bandwidth would be lower).

Further, the GRIN lens 5 might be replaced by a diffractive optical element such as a holographic lens. Also, should be noted that specific dimensions of the transceiver may vary, dependent upon parameters of laser diode 3 and detector 9, as well as the GRIN lens 5 and ferrule 11. Typically, however, the length of the transceiver is 25 mm.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A compact optical transceiver comprising:

a mounting block including at least first and second positioning grooves formed therein;

a light generating means, abutting a first end of the mounting block, for generating light of a first wavelength;

a light focusing means, mounted to the mounting block, for receiving and focusing the generated light to an optical fiber;

a beamsplitting means, mounted in the first positioning groove of the mounting block, for receiving and passing the generated light of the first wavelength and for receiving and deflecting light of a second wavelength different from the first wavelength;

a detecting means, abutting the mounting block, for receiving and detecting the deflected light of the second wavelength; and a ferrule, attachable to the optical fiber and supported in the second positioning groove of the mounting block, for receiving the focused light of a first wavelength passed through the beamsplitting means and for outputting light of a second wavelength from the optical fiber to the beamsplitting means.

2. The compact optical transceiver of claim 1, wherein the light generating means includes a laser diode.

3. The compact optical transceiver of claim 1, wherein the light generating means is secured between adjustable clamps associated with the mounting block.

4. The compact optical transceiver of claim 3, wherein the clamps are adjustable in at least one of a first direction perpendicular to a direction of travel of the generated light, and a second direction perpendicular to both the first direction and the direction of travel of the generated light.

5. The compact optical transceiver of claim 1, wherein the light generating means generates light of approximately 1.3 µm in wavelength.

6. The compact optical transceiver of claim 1, wherein the light focusing means includes a graded refractive index (GRIN) lens.

7. The compact optical transceiver of claim 1, wherein the beamsplitting means includes a dichroic coating on a glass substrate.

8. The compact optical transceiver of claim 1, wherein the beamsplitting means passes light of a wavelength less than or equal to approximately 1.3 µm and deflects light of a wavelength greater than or equal to approximately 1.55 µm.

9. The compact optical transceiver of claim 1, wherein the detecting means includes a blocking filter for blocking received light of a wavelength greater than 1.62 µm from being detected.

10. The compact optical transceiver of claim 1, further including:
    filtering means, mounted in a third positioning groove of the mounting block between the beamsplitting means and the ferrule, for blocking light, received from the ferrule, of a third wavelength, different from the first and second wavelength.

11. The compact optical transceiver of claim 10, wherein the filtering means includes a blocking filter for blocking received light of a wavelength greater than 1.62 µm from being deflected to the detecting means by the beamsplitting means.

12. The compact optical transceiver of claim 1, wherein the mounting block includes a bore hole, through which the deflected light travels from the beamsplitting means to the detecting means.

13. The compact optical transceiver of claim 1, wherein the second positioning groove of the mounting block is a V-shaped groove, in which the ferrule is adjustable in a direction parallel to the direction of travel of the generated light.

14. The compact optical transceiver of claim 1, wherein the mounting block is ceramic.

15. The compact optical transceiver of claim 1, wherein the first positioning groove includes at least one angled side extending in a direction perpendicular to a direction of travel of light from the generated light.

16. The compact optical transceiver of claim 1, wherein the second positioning groove is a V-shaped groove, including two angled sides extending in a direction parallel to a direction of travel of the generated light.

17. The compact optical transceiver of claim 1, wherein the optical fiber attached to the ferrule includes an end face with a 6°–9° face angle.

18. The compact optical transceiver of claim 1, wherein the mounting block, light generating means, light focusing means, beamsplitting means, detecting means, and ferrule are encapsulated in a membrane.

19. A compact optical transceiver comprising:
    a ceramic mounting block;
    a light source, abutting a first end of the ceramic mounting block, generating light of a first wavelength;
    a graded refractive index lens, mounted to the ceramic mounting block, receiving and focusing the generated light into an optical fiber;
    a beamsplitter, mounted on the ceramic block, receiving and passing the generated light of the first wavelength and receiving and deflecting light of a second wavelength different from the first wavelength;
    a detector, abutting the ceramic block, receiving and detecting the deflected light of the second wavelength; and
    a ferrule, attached to the optical fiber and the mounting block, receiving the focused and passed light of a first wavelength and outputting light of a second wavelength from the optical fiber to the beamsplitter.

20. The compact optical transceiver of claim 19, wherein the light source is secured between adjustable clamps of the ceramic mounting block.

21. The compact optical transceiver of claim 20, wherein the clamps are adjustable in at least one of a first direction perpendicular to a direction of travel of the generated light, and a second direction perpendicular to both the first direction and the direction of travel of the generated light.

22. The compact optical transceiver of claim 19, wherein the beamsplitter includes a dichroic coating on the surface of a glass substrate.

23. The compact optical transceiver of claim 19, wherein the beamsplitter passes light of a wavelength less than or equal to approximately 1.3 µm and deflects light of a wavelength greater than or equal to approximately 1.55 µm.

24. The compact optical transceiver of claim 19, wherein the dichroic coated side of the glass substrate passes light of a wavelength less than or equal to approximately 1.3 µm and deflects light of a wavelength greater than or equal to approximately 1.55 µm.

25. The compact optical transceiver of claim 19, further including:
    filter, mounted on the ceramic mounting block between the glass substrate and the ferrule, for blocking light received from the ferrule of a third wavelength, different from the first and second wavelength.

26. The compact optical transceiver of claim 19, wherein the ceramic mounting block includes a bore hole, through which the deflected light travels from the ferrule-proximate side of the glass element to the detector.

27. The compact optical transceiver of claim 19, wherein the ferrule is disposed for adjustable movement in a direction parallel to the direction of travel of the generated light.

28. The compact optical transceiver of claim 19, wherein the optical fiber attached to the ferrule includes an end face with a 6°–9° face angle.

29. The compact optical transceiver of claim 19, wherein the ceramic mounting block, light source, graded refractive index lens, beamsplitter, detector, and ferrule are encapsulated in a membrane.

* * * * *